(12) United States Patent
Rymer et al.

(10) Patent No.: US 7,968,186 B2
(45) Date of Patent: Jun. 28, 2011

(54) GLASS LAMINATES COMPRISING ACOUSTIC INTERLAYERS AND SOLAR CONTROL FILMS

(75) Inventors: Donald L. Rymer, Little Hocking, OH (US); Richard A. Hayes, Beaumont, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 641 days.

(21) Appl. No.: 11/825,041

(22) Filed: Jul. 3, 2007

(65) Prior Publication Data

US 2009/0011230 A1 Jan. 8, 2009

(51) Int. Cl.
*B32B 17/10* (2006.01)

(52) U.S. Cl. ........ 428/339; 428/332; 428/436; 428/437; 428/441; 428/442

(58) Field of Classification Search .................. 428/332, 428/436, 437, 441, 442, 339
See application file for complete search history.

(56) References Cited

U.S. PATENT DOCUMENTS

| | | |
|---|---|---|
| 4,368,945 A | 1/1983 | Fujimori et al. |
| 4,465,736 A | 8/1984 | Nishihara et al. |
| 4,732,216 A | 3/1988 | Polan |
| 4,786,738 A | 11/1988 | Kita et al. |
| 4,973,511 A | 11/1990 | Farmer et al. |
| 4,976,503 A | 12/1990 | Woodard |
| 5,091,258 A | 2/1992 | Moran |
| 5,190,826 A | 3/1993 | Asahina et al. |
| 5,340,654 A | 8/1994 | Ueda et al. |
| 5,368,917 A | 11/1994 | Rehfeld et al. |
| 5,464,659 A | 11/1995 | Melancon et al. |
| 5,478,615 A | 12/1995 | Rehfeld et al. |
| 5,773,102 A | 6/1998 | Rehfeld |
| 5,932,329 A | 8/1999 | Frost et al. |
| 5,965,853 A | 10/1999 | Hornsey |
| 6,074,732 A | 6/2000 | Garner et al. |
| 6,119,807 A | 9/2000 | Benson, Jr. et al. |
| 6,132,882 A | 10/2000 | Landin et al. |
| 6,204,480 B1 | 3/2001 | Woodard et al. |
| 6,391,400 B1 | 5/2002 | Russell et al. |
| 6,432,522 B1 | 8/2002 | Friedman et al. |
| 6,455,141 B1 | 9/2002 | Woodard et al. |
| 6,825,255 B2 | 11/2004 | Yuan et al. |
| 6,903,152 B2 * | 6/2005 | Toyama et al. ............... 524/403 |
| 2003/0111159 A1 * | 6/2003 | Hashimoto et al. ............ 156/99 |

FOREIGN PATENT DOCUMENTS

| | | |
|---|---|---|
| EP | 0 418 123 B1 | 3/1991 |
| EP | 1 235 683 B1 | 9/2002 |
| EP | 1 281 690 A1 | 2/2003 |
| EP | 1 342 565 B1 | 9/2003 |
| WO | WO 91/01880 | 2/1991 |
| WO | WO 96/28504 | 9/1996 |
| WO | WO 01/19747 A1 | 3/2001 |
| WO | WO 03/057478 A1 | 7/2003 |
| WO | WO 2004/039581 A1 | 5/2004 |

* cited by examiner

*Primary Examiner* — D. S Nakarani
(74) *Attorney, Agent, or Firm* — Maria M. Kourtakis; Kelly Law Registry

(57) ABSTRACT

An acoustic solar control laminate comprising a multi-layer interlayer formed of a solar control film bonded between two polymeric sheets with at least one being an acoustic poly (vinyl acetal) sheet is provided.

13 Claims, No Drawings

GLASS LAMINATES COMPRISING ACOUSTIC INTERLAYERS AND SOLAR CONTROL FILMS

FIELD OF THE INVENTION

The present invention relates to safety laminates with improved sound damping and solar control properties.

BACKGROUND OF THE INVENTION

Glass laminated products have contributed to society for almost a century. Beyond the well known, every day automotive safety glass used in windshields, laminated glass is used in windows for trains, airplanes, ships, and nearly every other mode of transportation. Safety glass is characterized by high impact and penetration resistance, and it does not scatter glass shards and debris when shattered.

Safety glass typically consists of a sandwich of two glass sheets or panels bonded together with an interlayer of a polymeric film or sheet. One or both of the glass sheets may be replaced with optically clear rigid polymeric sheets, such as sheets of polycarbonate materials. Safety glass has further evolved to include multiple layers of glass or rigid polymeric sheets bonded together with interlayers that may include one or more polymeric films or sheets.

The interlayer is typically made with a relatively thick polymeric film or sheet, which exhibits toughness and bondability to provide adhesion to the glass in the event of a crack or crash. Over the years, a wide variety of polymeric interlayers have been developed for use in safety glass. In general, these polymeric interlayers must possess a combination of characteristics including very high optical clarity, low haze, high impact resistance, high penetration resistance, excellent ultraviolet light resistance, good long term thermal stability, excellent adhesion to glass and other rigid polymeric sheets, low moisture absorption, high moisture resistance, and excellent long term weatherability. Widely used interlayer materials include complex, multicomponent compositions based on poly(vinyl butyral) (PVB), polyurethane (PU), poly(vinyl chloride) (PVC), metallocene-catalyzed linear low density polyethylenes (mPE or LLDPE), poly(ethylene-co-vinyl acetate) (EVA), polymeric fatty acid polyamides, polyesters (e.g., poly(ethylene terephthalate) (PET)), silicone elastomers, epoxy resins, elastomeric polycarbonates, and the like.

A more recent trend has been the use of glass laminated products in the construction business for homes and office structures. The use of architectural safety glass has expanded rapidly over the years as designers have incorporated more glass surfaces into buildings. In conjunction with this development, threat resistance has become an ever increasing requirement for architectural glass laminated products. Thus, newer safety glass products are designed to resist both natural and man made disasters. Examples of these needs include the recent developments of hurricane resistant glass, now mandated in hurricane susceptible areas, theft resistant glazings, and the more recent blast resistant glass laminated products. These products have great enough strength to resist intrusion even after the glass in the laminate has been broken, for example, the interlayer maintains its integrity against further insult when a glass laminate is subjected to high force winds and impacts of flying debris as occur in a hurricane or where there are repeated impacts on a window by a criminal attempting to break into a vehicle or structure.

In addition, glass laminated products have now reached the strength requirements for being incorporated as structural elements within buildings. An example of this would be glass staircases now being featured in many buildings.

Society continues to demand more functionality from laminated glass products beyond the strength and safety characteristics described above. One area of need is to reduce the energy consumption within the structure, such as an automobile or building, of which the laminated glass is a part. This need has been met through the development of solar control laminated glass structures. The solar energy strikes the earth over a wide spectral range of from 350 nm to 2,100 nm, with the maximum intensity found at 500 nm. The solar energy is divided into spectral regions, such as the ultraviolet region of 449 nm or less, the visible region of 450 nm to 749 nm and the near infrared region of 750 nm to 2,100 nm. The solar energy intensity distribution across these spectral regions is 4.44% for the ultraviolet region, 46.3% for the visible region and 49.22% for the near infrared region. Removing the energy from the visible region would sacrifice visual transparency through windows and, therefore, detract from the purpose for having windows. Since the near infrared region is not sensed by the human eye, however, typical solar control glass laminates have attempted to remove the energy from the near infrared region. For example, the air conditioning load in the summer may be reduced in buildings, automobiles and the like, which are equipped with solar control windows that prevent the transmission of near infrared radiation.

These solar control glass laminates may be obtained through modification of the glass or of the polymeric interlayer, through the addition of further solar control layers, or through combinations of these techniques.

A recent trend has been the use of metal oxide nanoparticles. These materials absorb the infrared light and convert the energy to heat. To preserve the clarity and transparency of the substrate, these materials need to have nominal particle sizes below about 50 nanometers (nm).

Infrared-absorbing nanoparticles which have attained commercial significance are antimony tin oxide (ATO) and indium tin oxide (ITO). These nanoparticles are typically produced through either a precipitation/calcination procedure or a flame pyrolysis process. Antimony tin oxide particles and indium tin oxide particles may be produced as disclosed within, e.g., U.S. Pat. No. 4,478,812; U.S. Pat. No. 4,937,148; U.S. Pat. No. 5,075,090; U.S. Pat. No. 5,376,308; U.S. Pat. No. 5,772,924; U.S. Pat. No. 5,807,511; U.S. Pat. No. 5,518,810; U.S. Pat. No. 5,622,750; U.S. Pat. No. 5,958,631; U.S. Pat. No. 6,051,166; and U.S. Pat. No. 6,533,966. These antimony tin oxide nanoparticles and indium tin oxide nanoparticles have been incorporated into polymeric interlayers of glass laminates or used to form solar control coatings on film substrates.

A more recent trend has been the use of metal boride nanoparticles, such as lanthanum hexaboride (LaB6). These materials also absorb the infrared light and convert the energy to heat. To preserve the clarity and transparency of the substrate, these materials need to have nominal particle sizes below about 200 nanometers (nm).

A shortcoming of solar control laminates which incorporate infrared absorptive materials is that a significant proportion of the light absorbed serves to generate heat, some of which radiates into the very structure that the solar control laminate was meant to protect. This is especially true for stationary structures, such as parked automobiles and buildings.

One development to produce solar control laminated glass is the inclusion of metallized substrate films, such as polyester films, which have metal layers, such as aluminum or silver metal, applied thereon through a vacuum deposition or a sputtering process. These supported metal stacks are disclosed in, e.g., U.S. Pat. No. 3,718,535; U.S. Pat. No. 3,816,201; U.S. Pat. No. 3,962,488; U.S. Pat. No. 4,017,661; U.S. Pat. No. 4,166,876; U.S. Pat. No. 4,226,910; U.S. Pat. No. 4,234,654; U.S. Pat. No. 4,368,945; U.S. Pat. No. 4,386,130; U.S. Pat. No. 4,450,201; U.S. Pat. No. 4,465,736; U.S. Pat. No. 4,782,216; U.S. Pat. No. 4,786,783; U.S. Pat. No. 4,799,745; U.S. Pat. No. 4,973,511; U.S. Pat. No. 4,976,503; U.S. Pat. No. 5,024,895; U.S. Pat. No. 5,069,734; U.S. Pat. No. 5,071,206; U.S. Pat. No. 5,073,450; U.S. Pat. No. 5,091,258; U.S. Pat. No. 5,189,551; U.S. Pat. No. 5,264,286; U.S. Pat. No. 5,306,547; U.S. Pat. No. 5,932,329; U.S. Pat. No. 6,391,400; and U.S. Pat. No. 6,455,141. The metallized films are generally disclosed to reflect the appropriate light wavelengths to provide the desired solar control properties. For example, Fujimori, et. al., in U.S. Pat. No. 4,368,945, disclose an infrared reflecting laminated glass for automobile consisting of an infrared reflecting film with tungsten oxide layers between a silver layer sandwiched between poly(vinyl butyral) layers which incorporate ultraviolet absorbents. Brill, et. al., in U.S. Pat. No. 4,450,201, disclose a multilayer heat barrier film. Nishihara, et. al., in U.S. Pat. No. 4,465,736, disclose a laminate with a selective light transmitting film. Woodard, in U.S. Pat. No. 4,782,216 and U.S. Pat. No. 4,786,783, discloses a transparent, laminated window with near infrared rejection which included two transparent conductive metal layers. Farmer, et. al., in U.S. Pat. No. 4,973,511, disclose a laminated solar window construction which includes a PET sheet with a multilayer solar coating. Woodard, in U.S. Pat. No. 4,976,503, discloses an optical element for a motor vehicle windshield which includes light-reflecting metal layers. Hood, et. al., in U.S. Pat. No. 5,071,206, disclose reflecting interference films. Moran, in U.S. Pat. No. 5,091,258, discloses a laminate which incorporates an infra-red radiation reflecting interlayer. Frost, et. al., in U.S. Pat. No. 5,932,329, disclose a laminated glass pane comprising a transparent support film of a tear-resistant polymer provided with an infrared-reflecting coating and two adhesive layer. Woodard, et. al., in U.S. Pat. No. 6,204,480, disclose thin film conductive sheets for automobile windows. Russell, et. al., in U.S. Pat. No. 6,391,400, disclose dielectric layer interference effect thermal control glazings for windows. Woodard, et. al., in U.S. Pat. No. 6,455,141, disclose a laminated glass that incorporates an interlayer carrying an energy-reflective coating. Kramling, et. al., in EP 0 418 123 B1, disclose laminated glass with an interlayer comprising a copolymer of vinyl chloride and glycidyl methacrylate with a plasticizer content of 10 to 40 wt % or a thermoplastic polyurethane. The interlayer may be coated with a reflecting film and the reflecting film may have a surface resistivity of between 2 and 6 Ohms per square. Longmeadow, in U.S. Pat. No. 7,157,133, discloses embossed reflective laminates.

Laminated glass products are capable of providing even more useful properties beyond the safety, display, and solar control characteristics described above. One area of need is for the automotive windshield to function as an acoustic barrier to reduce the level of noise intrusion into the automobile. Acoustic laminated glass is generally known within the art. For example, Asahina, et. al., in U.S. Pat. No. 5,190,826, disclose a sound-insulating interlayer for glass laminates, the interlayer in the form of a laminated film comprising at least one resin film of a poly(vinyl acetal) having a degree of acetalization of at least 50% prepared from an aldehyde having 6 to 10 carbon atoms and a plasticizer and at least one resin film of a poly(vinyl acetal) having a degree of acetalization of at least 50% prepared from an aldehyde having 1 to 4 carbon atoms and a plasticizer or the interlayer in the form of a laminated film comprising a mixture of a poly(vinyl acetal) having a degree of acetalization of at least 50% prepared from an aldehyde having 6 to 10 carbon atoms, a poly(vinyl acetal) having a degree of acetalization of at least 50% prepared from an aldehyde having 1 to 4 carbon atoms and a plasticizer. Ueda, et. al., in U.S. Pat. No. 5,340,654, disclose a sound-insulating interlayer for glass laminates comprising laminated layers of at least one layer which comprises a plasticizer and a poly(vinyl acetal) resin which has 4 to 6 carbon atoms in the acetal group and the average amount of ethylene groups bonded to acetyl groups is 8 to 30 mole % and of at least one layer which comprises a plasticizer and a poly(vinyl acetal) resin which has 3 to 4 carbon atoms in the acetal group and the average amount of ethylene groups bonded to acetyl groups is 4 mole % or less. Rehfeld, et. al., in U.S. Pat. No. 5,368,917 and U.S. Pat. No. 5,478,615, disclose acoustic laminated glazings for vehicles comprising conventional poly(vinyl butyral). The sound damping properties of the poly(vinyl butyral) laminate described therein is highly temperature dependent. Melancon, et. al., in U.S. Pat. No. 5,464,659, disclose radiation curable silicone/acrylate vibration damping articles. Rehfeld, in U.S. Pat. No. 5,773,102, discloses multilayer acoustic laminates comprising a non-acoustic layer and an acoustic layer, wherein the acoustic layer may be composed of certain plasticized terpoly(vinyl chloride-co-glycidyl methacrylate-co-ethylene) materials. Hornsey, in U.S. Pat. No. 5,965,853, discloses a vibration dampening sound absorbing aircraft transparency. Garnier, et. al., in U.S. Pat. No. 6,074,732, disclose a soundproofing laminated window made of two glass sheets with a PVB/PET/acrylate/PET/PVB interlayer. Benson, Jr., et. al., in U.S. Pat. No. 6,119,807, disclose sound dampening glazing which includes a sheet of a sound dampening material. Landin, et. al., in U.S. Pat. No. 6,132,882, disclose acoustic glass laminates which incorporate certain acrylate acoustic layers. Friedman, et. al., in U.S. Pat. No. 6,432,522, disclose an acoustical barrier glazing which includes a multilayer interlayer. Yuan, et. al., in U.S. Pat. No. 6,825,255, disclose certain plasticized poly(vinyl butyral) sheets which include a fatty acid amide. Keller, et. al., in U.S. Pat. No. 6,887,577, disclose acoustic glass laminates which incorporate an acoustic layer of a plasticized poly(vinyl butyral) which includes 50 to 80 wt % of a poly(vinyl butyral) and 20 to 50 wt % of a softener mixture. Bennison, et. al., in US 2006/0008648, disclose a glass laminate interlayer having sound-damping properties comprising a poly(vinyl butyral) resin having a hydroxyl number in the range of from 17 to 23 and 40 to 50 parts per hundred of a single plasticizer.

Accordingly, described herein are durable and safe glass laminates with improved sound damping and solar control properties.

SUMMARY OF THE INVENTION

Described herein is an acoustic solar control laminate comprising: (a) a first rigid sheet; (b) a first polymeric sheet; (c) a polymeric film, which is coated on at least one side with an infrared energy reflective layer; (d) a second polymeric sheet; and (e) a second rigid sheet, wherein the first rigid sheet is adhered to the first polymeric sheet; the first polymeric sheet is adhered to the polymeric film; the polymeric film is adhered to the second polymeric sheet; and the second polymeric sheet is adhered to the second rigid sheet, and further wherein the first polymeric sheet comprises an acoustic poly(vinyl acetal) composition having a glass transition temperature of 23° C. or less; and wherein the first and the second rigid sheets are each formed of a material having a modulus of at least about 100,000 psi (690 MPa).

In one particular embodiment, the acoustic poly(vinyl acetal) composition used here comprises a poly(vinyl acetal) produced by acetalizing a poly(vinyl alcohol) with an aldehyde containing 6 to 10 carbon atoms. Or preferably, the poly(vinyl acetal) has an acetalization degree of at least about 50 mole %.

In another embodiment, the acoustic poly(vinyl acetal) composition used herein comprises a poly(vinyl acetal) having about 8 to about 30 mole % of acetoxy groups, based on the total number of moles of vinyl groups in the poly(vinyl acetal). Preferably, the poly(vinyl acetal) is produced by acetalizing a poly(vinyl alcohol) with an aldehyde containing 4 to 6 carbon atoms. More preferably, the aldehyde used herein is a n-butyl aldehyde and the poly(vinyl acetal) is a poly(vinyl butyral).

In yet another embodiment, the acoustic poly(vinyl acetal) composition used herein comprises a poly(vinyl acetal) and about 40 to about 60 parts per hundred (pph) of a plasticizer, based on 100 parts by weight of the poly(vinyl acetal). And preferably, the poly(vinyl acetal) is a poly(vinyl butyral).

In yet another embodiment, the acoustic poly(vinyl acetal) sheet used herein has a thickness of at least about 0.25 mm, or about 0.38 to about 1.74 mm.

In yet another embodiment, the second polymeric sheet used herein comprises a second acoustic poly(vinyl acetal) composition having glass transition temperatures of 23° C. or less, and wherein the acoustic poly(vinyl acetal) compositions in the first and second polymeric sheets may be the same or different.

In yet another embodiment, the second polymeric sheet comprises a poly(ethylene-co-vinyl acetate).

In yet another embodiment, the polymeric film used herein comprises a polyester, or a poly(ethylene terephthalate).

In yet another embodiment, the infrared energy reflective layer applied on the polymeric film comprises a metal layer or a Fabry-Perot type interference filter layer.

In yet another embodiment, each of the first and second rigid sheets used herein comprises a material selected from glasses and polymers.

The invention is further directed to an acoustic solar control laminate consisting essentially of: (a) a first glass sheet; (b) a first polymeric sheet comprising an acoustic poly(vinyl acetal) composition having a glass transition temperature of 23° C. or less; (c) a polymeric film, which is coated on one side with an infrared energy reflective layer; (d) a second polymeric sheet; and (e) a second glass sheet, wherein the first glass sheet is adhered to the first polymeric sheet; the first polymeric sheet is adhered to the polymeric film; the polymeric film is adhered to the second polymeric sheet; and the second polymeric sheet is adhered to the second glass sheet.

The invention is yet further directed to an acoustic solar control laminate consisting essentially of: (a) a first glass sheet; (b) a first polymeric sheet comprising a first acoustic poly(vinyl acetal) composition having a glass transition temperature of 23° C. or less; (c) a polymeric film, which is coated on one side with an infrared energy reflective layer; (d) a second polymeric sheet comprising a second acoustic poly(vinyl acetal) composition having a glass transition temperature of 23° C. or less; and (e) a second glass sheet, wherein the first glass sheet is adhered to the first polymeric sheet; the first polymeric sheet is adhered to the polymeric film; the polymeric film is adhered to the second polymeric sheet; and the second polymeric sheet is adhered to the second glass sheet.

The invention is yet further directed to an acoustic solar control laminate consisting essentially of: (a) a first glass sheet; (b) a first polymeric sheet comprising an acoustic poly(vinyl acetal) composition having a glass transition temperature of 23° C. or less; (c) a polymeric film, which is coated on one side with an infrared energy reflective layer; (d) a second polymeric sheet comprising a poly(ethylene-co-vinyl acetate); and (e) a second glass sheet, wherein the first glass sheet is adhered to the first polymeric sheet; the first polymeric sheet is adhered to the polymeric film; the polymeric film is adhered to the second polymeric sheet; and the second polymeric sheet is adhered to the second glass sheet.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the invention, suitable methods and materials are described herein.

The following definitions apply to the terms as used throughout this specification, unless otherwise limited in specific instances.

As used herein, the term "acoustic" refers to certain poly(vinyl acetal) compositions for convenience in describing the invention, although the actual materials may be called by other names in some instances, and any poly(vinyl acetal) composition having the general characteristics described herein for acoustic poly(vinyl acetal) compositions can be used in practicing the invention.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format." Optional additives as defined herein, at levels that are appropriate for such additives, and minor impurities are not excluded from a composition by the term "consisting essentially of", however.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Use of "a" or "an" are employed to describe elements and components of the invention. This is done merely for convenience and to give a general sense of the invention. This description should be read to include one or at least one and the singular also includes the plural unless it is obvious that it is meant otherwise.

Polymers are sometimes referred to herein by the monomers used to make them or the amounts of the monomers used to make them. Such a description may not include a formal nomenclature used to describe the final polymer or may not contain product-by-process terminology. Nevertheless, any such reference to monomers and amounts means that the polymer is made from those monomers or that amount of the monomers, and also refers to the corresponding polymers and compositions thereof.

The materials, methods, and examples herein are illustrative only and, except as specifically stated, are not intended to be limiting.

Provided herein are safety laminates having improved sound damping and solar control properties. Specifically, described herein is a safety laminate comprising a first and a second outer layers formed of rigid sheets and a multi-layer interlayer comprising a first and a second polymeric sheets and a solar control film, wherein (a) the solar control film is bonded or adhered between the first and the second polymeric sheets; (b) the first polymeric sheet is formed of an acoustic poly(vinyl acetal) composition; and (c) the second polymeric sheet is formed of any suitable polymeric material. Polymeric materials suitable in forming the second polymeric sheet include, but are not limited to, poly(vinyl acetal)s (including acoustic poly(vinyl acetal)s); acid copolymers of alpha-olefins and alpha,beta-ethylenically unsaturated carboxylic acids having 3 to 8 carbons; ionomers derived from partially or fully neutralized acid copolymers of alpha-olefins and alpha,beta-ethylenically unsaturated carboxylic acids having 3 to 8 carbons; poly(ethylene-co-vinyl acetate)s (EVA); ethyl acrylic acetates (EM); ethyl methacrylates (EMAC); and metallocene-catalyzed polyethylenes. In one preferred embodiment, the second polymeric sheet is also formed of an acoustic poly(vinyl acetal) composition wherein the two acoustic poly(vinyl acetal) compositions used to form the two polymeric sheets may be the same or different. In another preferred embodiment, the second polymeric sheet is formed of a composition comprising a poly(ethylene-co-vinyl acetate). In yet another preferred embodiment, the second polymeric sheet is formed of a composition comprising an ionomer.

In each of the above embodiments, the bonded layers are adjacent layers. Moreover, the "second" layer of any film or sheet may be the same as or different from the first layer of that film or sheet. Furthermore, in some preferred embodiments of the invention, the adjacent layers are directly laminated or adhered to each other so that they are adjoining or, more preferably, contiguous.

Moreover, the acoustic solar control laminates described herein may comprise adhesive layers to enhance adhesion between the constituent layers. Conventional adhesives, such as silanes or poly(alkyl amines) can be useful as optional components. When one or more adhesive layer is present, they may be the same or different. Typically, however, the interlayers described herein do not require an adhesive to promote adhesion to glass.

Polymeric Compositions

I. Acoustic Poly(Vinyl Acetal) Compositions:

In the present invention, "acoustic poly(vinyl-acetal) composition" is used to mean that the poly(vinyl acetal) composition has a glass transition temperature (Tg) of 23° C. or less. Preferably the Tg is about 20° C. to about 23° C. As used herein, the Tg of the poly(vinyl acetal) composition is determined as described in US 2006/0210776 by rheometric dynamic shear mode analysis using the following procedure. A polymer sheet of an acoustic poly(vinyl acetal) composition is molded into a sample disc of 25 mm in diameter. The polymeric sample sheet is placed between two 25 mm diameter parallel plate test fixtures of a Rheometrics Dynamic Spectrometer II (available from Rheometrics, Incorporated, Piscataway, N.J.). The polymer sample sheet is tested in shear mode at an oscillation frequency of 1 Hertz as the temperature of the sample is increased from −20° C. to 70° C. at a rate of 2° C./minute. The position of the maximum value of tan delta (damping) plotted as dependent on temperature is used to determine glass transition temperature.

In one preferred embodiment, the acoustic poly(vinyl acetal) composition comprises at least one poly(vinyl acetal) with acetal groups derived from reacting poly(vinyl alcohol) with one or more aldehydes containing 6 to 10 carbon atoms. Preferably, the poly(vinyl acetal)s are produced by acetalizing poly(vinyl alcohol)s with one or more aldehydes containing 6 to 10 carbon atoms to a degree of acetalization of at least 50 mole %. Preferred poly(vinyl alcohol)s are those having an average polymerization degree of from about 1000 to about 3000 and are at least 95 mole % in saponification degree. Preferably the poly(vinyl alcohol) contains residual acetoxy groups in the range of from about 2 to about 0.01 mole % of the total of the main chain vinyl groups. The aldehydes having 6 to 10 carbon atoms may include aliphatic, aromatic or alicyclic aldehydes. The aliphatic aldehydes may include straight chain or branched alkyl groups. Specific examples of aldehydes having 6 to 10 carbon atoms include n-hexylaldehyde, 2-ethylbutyraldehyde, n-heptylaldehyde, n-octylaldehyde, n-nonylaldehyde, n-decylaldehyde, benzaldehyde, and cinnamaldehyde. The aldehydes may be used alone or in combinations. Preferably, the aldehydes have 6 to 8 carbon atoms.

The poly(vinyl acetal)s in this embodiment may be produced through any known art method. For example, the poly (vinyl acetal)s may be prepared by dissolving the poly(vinyl alcohol) in hot water to obtain an aqueous solution, adding the desired aldehyde and catalyst to the solution which is maintained at the required temperature to cause the acetalization reaction to proceed. The as obtained reaction mixture is then maintained at an elevated temperature to complete the reaction, followed by neutralization, washing with water and drying to obtain the desired product in the form of a resin powder.

Suitable poly(vinyl acetal) compositions in this embodiment preferably further include one or more plasticizers. The plasticizer(s) to be admixed with the above produced poly (vinyl acetal)s may be a monobasic acid ester, a polybasic acid ester or like organic plasticizer, or an organic phosphate or organic phosphite plasticizer. Preferable specific examples of the monobasic esters include glycol esters prepared by the reaction of triethylene glycol with butyric acid, isobutyric acid, caproic acid, 2-ethylbutyric acid, heptanoic acid, n-octylic acid, 2-ethylhexylic acid, pelagonic acid (n-nonylic acid), decylic acid, and the like and mixtures thereof. Additional useful monobasic acid esters may be prepared from tetraethylene glycol or tripropylene glycol with the above mentioned organic acids. Preferable examples of the polybasic acid esters include those prepared from adipic acid, sebacic acid, azelaic acid, and the like and mixtures thereof, with a straight-chain or branched-chain alcohol having 4 to 8 carbon atoms. Preferable examples of the phosphate or phosphite plasticizers include tributoxyethyl phosphate, isodecylphenyl phosphate, triisopropyl phosphite and the like and mixtures thereof. More preferable plasticizers include monobasic esters such as triethylene glycol di-2-ethylbutyrate, triethylene glycol di-2-ethylhexoate, triethylene glycol dicaproate and triethylene glycol di-n-octoate, and dibasic acid esters such as dibutyl sebacate, dioctyl azelate and dibutylcarbitol adipate.

Preferably the plasticizer is used in an amount of about 30 to about 60 parts by weight per 100 parts by weight of the poly(vinyl acetal). More preferably the plasticizer is used in an amount of about 30 to about 55 parts by weight per 100 parts by weight of the poly(vinyl acetal).

Further additives may also be incorporated into the acoustic poly(vinyl acetal) composition. For example, metal salts of carboxylic acids, including potassium, sodium, or the like alkali metal salts of octylic acid, hexylic acid, butyric acid, acetic acid, formic acid and the like, calcium, magnesium or the like alkaline earth metal salts of the above mentioned acids, zinc and cobalt salts of the above mentioned acids, and stabilizers, such as surfactants such as sodium laurylsulfate and alkylbenzenesulfonic acids may be included. Such acoustic poly(vinyl acetal) compositions are described within, for example, U.S. Pat. No. 5,190,826.

In another preferred embodiment, the acoustic poly(vinyl acetal) composition comprises at least one poly(vinyl acetal) with acetoxy groups in the range of about 8 to about 30 mole % of the total of the main chain vinyl groups. Preferably the acoustic poly(vinyl acetal)s contain acetal groups derived from reacting poly(vinyl alcohol)s with one or more aldehydes containing 4 to 6 carbon atoms. The aldehydes are preferably aliphatic, and, when aliphatic, may include straight chain or branched alkyl groups. These acoustic poly (vinyl acetal)s may be prepared from poly(vinyl alcohol)s having an average degree of polymerization of about 500 to about 3000. More preferably, these poly(vinyl acetal)s may be prepared from poly(vinyl alcohol)s having an average degree of polymerization of about 1000 to about 2500. Specific examples of aldehydes which incorporate from 4 to 6 carbon atoms include, n-butyl aldehyde, isobutyl aldehyde, valeraldehyde, n-hexyl aldehyde and 2-ethylbutyl aldehyde and mixtures thereof. Preferable aldehydes which incorporate from 4 to 6 carbon atoms include n-butyl aldehyde, isobutyl aldehyde and n-hexyl aldehyde and mixtures thereof. More preferably, the aldehyde which incorporates from 4 to 6 carbon atoms is a n-butyl aldehyde and the poly(vinyl acetal) is poly(vinyl butyral). Preferably, the degree of acetalization for the resulting poly(vinyl acetal) is 40 mole % or greater, more preferably, 50 mole % or greater. These poly(vinyl acetal)s may be prepared as described above or below. Useful plasticizers as described above or below may also be included in these acoustic poly(vinyl acetal) compositions. Preferably the plasticizer is used in an amount of from about 30 to about 70 parts by weight per 100 parts by weight of the poly(vinyl acetal), more preferably about 35 to about 65 parts by weight per 100 parts by weight of the poly(vinyl acetal). Further additives may be incorporated into the acoustic poly(vinyl acetal) composition as described above or below. Such acoustic plasticized poly(vinyl acetal) compositions are described within, for example, U.S. Pat. No. 5,340,654 and EP 1 281 690.

In yet another preferred embodiment, the acoustic poly (vinyl acetal) composition comprises at least one poly(vinyl acetal) and plasticizer(s) in an amount of about 40 to about 60 parts per hundred (pph) (preferably about 40 to about 50 pph) based on 100 parts by weight of the poly(vinyl acetal)s. Preferably the poly(vinyl acetal) is produced by acetalizing a poly(vinyl alcohol) with at least 95 mole % saponification degree. Preferably the acoustic poly(vinyl acetal) composition contains plasticizer in an amount of about 40 to about 60 parts per hundred (pph) based on 100 parts by weight of the poly(vinyl acetal). Preferably the poly(vinyl acetal) is a poly (vinyl butyral). Such acoustic poly(vinyl butyral) compositions are disclosed within US 2006/008648; US 2006/ 0210776 and US 2006/0210782.

The acoustic poly(vinyl butyral) disclosed in this embodiment will typically have a weight average molecular weight ranging from about 30,000 to about 600,000 Daltons (Da), or preferably, from about 45,000 to about 300,000 Da, or more preferably, from about 200,000 to about 300,000 Da, as measured by size exclusion chromatography using low angle laser light scattering. The preferable poly(vinyl butyral) material will incorporate 0 to about 10%, or preferably, 0 to about 3%, of residual ester groups, calculated as polyvinyl ester, typically acetate groups, with the balance being butyraldehyde acetal. The poly(vinyl butyral) may also incorporate a minor amount of acetal groups other than butyral, for example, 2-ethyl hexanal, as disclosed within U.S. Pat. No. 5,137,954.

Within this embodiment, usable plasticizers are those known within the art, for example, as disclosed within U.S. Pat. No. 3,841,890, U.S. Pat. No. 4,144,217, U.S. Pat. No. 4,276,351, U.S. Pat. No. 4,335,036, U.S. Pat. No. 4,902,464, U.S. Pat. No. 5,013,779, and WO 96/28504. Preferable plasticizers include diesters of polyethylene glycol such as triethylene glycol di(2-ethylhexanoate), tetraethylene glycol diheptanoate and triethylene glycol di(2-ethylbutyrate) and dihexyl adipate. Preferably, the plasticizer is one that is compatible (that is, forms a single phase with the poly(vinyl butyral) resin) in the amounts described hereinabove with a poly(vinyl butyral) having a hydroxyl number (OH number) of about 12 to about 23.

In the above acoustic poly(vinyl acetal) compositions, an adhesion control additive, for, e.g., controlling the adhesive bond between the rigid sheet layers and the acoustic poly (vinyl acetal) sheets, may also be included. These are generally alkali metal or alkaline earth metal salts of organic and inorganic acids. Preferably, they are alkali metal or alkaline earth metal salts of organic carboxylic acids having from 2 to 16 carbon atoms. More preferably, they are magnesium or potassium salts of organic carboxylic acids having from 2 to 16 carbon atoms. The adhesion control additive is typically used in the range of about 0.001 to about 0.5 wt % based on the total weight of the polymeric sheet composition. Other additives, such as antioxidants, ultraviolet absorbers, ultraviolet stabilizers, thermal stabilizers, colorants and the like, such as described above and within U.S. Pat. No. 5,190,826, may also be added to the acoustic poly(vinyl butyral) composition.

II. Poly(ethylene-co-vinyl acetate) Compositions:

The poly(ethylene-co-vinyl acetate) composition used here comprises at least one poly(ethylene-co-vinyl acetate) having a level of copolymerized vinyl acetate comonomers of about 10 to about 50 wt %, or preferably, about 20 to about 40 wt %, or more preferably, about 25 to about 35 wt %, based on the total weight of the composition. The poly(ethylene-co-vinyl acetate) used herein may further contain copolymerized residues of other unsaturated comonomers. Specific examples of other unsaturated comonomers include, but are not limited to, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol) acrylate, poly(ethylene glycol) methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimenthyl fumarate, vinyl propionate, acrylic acid, methacrylic acid, fumaric acid, maleic acid, maleic anhydride and the like and mixtures thereof. Preferably, the other unsaturated comonomers are selected from the group consisting of methyl acrylate, methyl methacrylate, butyl acrylate, butyl methacrylate, glycidyl methacrylate, acrylic acid, methacrylic acid and mixtures thereof. The poly(ethylene-co-vinyl acetate) used herein may contain up to about 50 wt %, or preferably, up to about 25 wt %, of the copolymerized residues of the other unsaturated comonomer, based on the total weight of the composition.

The poly(ethylene-co-vinyl acetate) compositions used herein may further contain suitable plasticizers, such as polybasic acid esters and polyhydric alcohol esters, or such as dioctyl phthalate, dihexyladipate, triethylene glycol-di-2-ethylbutylate, butyl sebacate, tetraethylene glycol heptanoate, triethylene glycol dipelargonate and the like and mixtures thereof. In general, the plasticizer level within the poly(ethylene-co-vinyl acetate) composition does not exceed about 5 wt %, based on the total weight of the composition.

The poly(ethylene-co-vinyl acetate) composition used herein may further incorporate an organic peroxide. Preferably, the organic peroxide has a thermal decomposition temperature of about 70° C. or greater, or more preferably, about 100° C. or greater, in a half-life of 10 hours. The selection of the appropriate organic peroxide may be chosen by one skilled in the art with consideration of sheet-forming temperature, process for preparing the composition, curing (bonding) temperature, heat resistance of body to be bonded, storage stability, and the like. Specific examples of the suitable organic peroxide include, but are not limited to, 2,5-dimethylhexane-2,5-dihydroperoxide, 2,5-dimethyl-2,5-(t-butylperoxy)hexane-3-di-t-butylperoxide, t-butylcumyl peroxide, 2,5-dimethyl-2,5-di(t-butylperoxy)hexane, dicumyl peroxide, alpha,alpha'-bis(t-butylperoxyisopropyl)benzene, n-butyl-4,4-bis(t-butylperoxy)valerate, 2,2-bis(t-butylperoxy)butane, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethyl-2,5-bis(t-butylperoxy)-3,3,5-trimethylcyclohexane, 1-bis(t-butylperoxy)cyclohexane, 2,5-dimethylhexyl-2,5-bisperoxybenzoate, t-butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, t-butylperoxyisobutylate and 2,4-dichlorobenzoyl peroxide and the like and mixtures thereof. The organic peroxide level may be within the range of about 0.1 to about 5 wt %, based on the total weight of the composition.

Alternatively, the poly(ethylene-co-vinyl acetate) resin may be cured by light. In this instance, the organic peroxide may be replaced in whole or in part with a photoinitiator or photosensitizer. Preferably, the level of the photoinitiator is within the range of about 0.1 to about 5 wt %, based on the total weight of the composition. Specific examples of the suitable photoinitiators include, but are not limited to, benzoin, benzophenone, benzoyl methyl ether, benzoin ethyl ether, benzoin isopropyl ether, benzoin isobutyl ether, dibenzyl, 5-nitroacenaphtene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone and the like and mixtures thereof.

To further improve or adjust the various properties thereof, such as, mechanical strength, adhesion properties, optical characteristics such as transparency, heat resistance, light-resistance, rate of crosslinking and the like, the poly(ethylene-co-vinyl acetate) compositions used herein may further include acryloyl(oxy) group containing compounds, methacryloyl(oxy) group containing compounds and/or epoxy group containing compounds. These materials are preferably included at a level of up to about 50 wt %, or more preferably, up to about 10 wt %, or yet more preferably, about 0.1 to about 2 wt %, based on the total weight of composition. Examples of the acryloyl(oxy) and methacryloyl(oxy) group containing compounds include derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, 3-chloro-2-hydroxypropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol. One example of the amide is diacetone acrylamide. Examples of polyfunctional compounds include esters of plural acrylic acids or methacrylic acids with polyhydric alcohol such as glycerol, trimethylol propane or pentaerythritol. Examples of the epoxy group containing compounds include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)sub-5 glycidyl ether, p-tert-butylphenyl glycidyl ether, diglycidyl adipate, diglycidyl phthalate, glycidyl methacrylate and butyl glycidyl ether, and the like and mixtures thereof.

The poly(ethylene-co-vinyl acetate) composition used herein may also incorporate a silane coupling agent to enhance the adhesive strengths. Specific examples of the preferable silane coupling agent may include, for example, gamma-chloropropylmethoxysilane, vinyltriethoxysilane, vinyltris(beta-methoxyethoxy)silane, gamma-methacryloxypropylmethoxysilane, vinyltriacetoxysilane, gamma-glycidoxypropyltrimethoxysilane, gamma-glycidoxypropyltriethoxysilane, beta-(3,4-epoxycyclohexyl)ethyltrimethoxysilane, vinyltrichlorosilane, gamma-mercaptopropylmethoxysilane, gamma-aminopropyltriethoxysilane, N-beta-(aminoethyl)-gamma-aminopropyltrimethoxysilane, and the like and mixtures thereof. These silane coupling agent materials are preferably used at a level of up to about 5 wt %, or more preferably, about 0.001 to about 5 wt %, based on the total weight of the composition.

Poly(ethylene-co-vinyl acetate) compositions suitable for the present invention may be obtained from the Bridgestone Corporation (Nashville, Tenn. ("Bridgestone")), the Exxon Mobil Corporation (Houston, Tex.), Specialized Technologies Resources, Inc. (Enfield, Conn.), and E.I. du Pont de Nemours and Company (Wilmington, Del. ("DuPont")).

III. Additives:

It is understood that the polymeric compositions disclosed above may further comprise one or more suitable additives. The additives may include fillers, plasticizers, processing aides, flow enhancing additives, lubricants, pigments, dyes, colorants, flame retardants, impact modifiers, nucleating agents, lubricants, antiblocking agents such as silica, slip agents, thermal stabilizers, UV absorbers, UV stabilizers, hindered amine light stablizers, dispersants, surfactants, chelating agents, coupling agents, adhesives, primers and the like.

The polymeric compositions may contain an effective amount of a thermal stabilizer. Thermal stabilizers are well disclosed within the art. Any thermal stabilizer may find utility herein. Preferable general classes of thermal stabilizers include phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and the like and mixtures thereof. This should not be considered limiting. Essentially any thermal stabilizer can be used. The compositions preferably incorporate 0 to about 1.0 wt % of thermal stabilizers, based on the total weight of the composition.

The polymeric compositions may contain an effective amount of UV absorber(s). UV absorbers are well disclosed within the art. Preferable general classes of UV absorbers include benzotriazoles, hydroxybenzophenones, hydroxyphenyl triazines, esters of substituted and unsubstituted benzoic acids, and the like and mixtures thereof. This should not be considered limiting. Essentially any UV absorber may be used. The compositions preferably contain 0 to about 1.0 wt % of UV absorbers, based on the total weight of the composition.

The polymeric compositions may contain an effective amount of hindered amine light stabilizers (HALS). Hindered amine light stabilizers are generally well disclosed within the art. Generally, hindered amine light stabilizers are disclosed to be secondary, tertiary, acetylated, N-hydrocarbyloxy substituted, hydroxy substituted N-hydrocarbyloxy substituted, or other substituted cyclic amines which further contain steric hindrance, generally derived from aliphatic substitution on the carbon atoms adjacent to the amine function. This should not be considered limiting. Essentially any hindered amine light stabilizer may be used. The compositions preferably contain 0 to about 1.0 wt % of hindered amine light stabilizers, based on the total weight of the composition.

Polymeric Sheets

The polymeric sheets used to form the multi-layer interlayer are formed of any of the above described polymeric compositions. The polymeric sheets may be multilayer polymeric sheets or monolayer polymeric sheets. In a preferred embodiment, the polymeric sheets are monolayer polymeric sheets based on manufacturing ease, such as the ability to recycle scrap sheet back into the sheeting process. Typically, any of these polymeric sheets has a thickness of about 10 mils (0.25 mm) or greater, or preferably, about 15 mils (0.38 mm) or greater, or more preferably, about 30 mils (0.75 mm) or greater. To provide the properties required for the expected performance of conventional poly(vinyl butyral) sheeting, the thickness of an acoustic poly(vinyl acetal) sheet used herein should be in the range of from about 15 to about 70 mils (about 0.38-about 1.75 mm), or preferably, about 20 to about 60 mils (about 0.5-about 1.5 mm), or more preferably, about 30 to about 45 mils (about 0.76 to about 1.13 mm), at the thickest point. In a preferred embodiment, the sheet thickness is homogeneous across the width of the acoustic poly(vinyl acetal) sheet, e.g.; the thickness is the same at all edges of the sheet. As for a poly(ethylene-co-vinyl) sheet, it is preferred that the thickness ranges from about 10 to about 70 mils (about 0.25-about 1.75 mm), or more preferably, about 15 to about 60 mils (about 0.38-about 1.5 mm), or yet more preferably, about 30 to about 45 mils (about 0.76-about 1.13 mm). The desired thickness of the sheet may represent the use of one single sheet or may represent multiple sheets having individual thicknesses such that when they are stacked together they provide the desired total thickness of the interlayer. The polymeric sheets used herein may be of any width and length.

The polymeric sheets used herein may be formed by any suitable process, such as extrusion, calendering, solution casting or injection molding. The parameters for each of these processes can be easily determined by one of ordinary skill in the art depending upon viscosity characteristics of the polymeric composition used and the desired thickness of the sheet.

The polymeric sheets are preferably formed by extrusion.

The polymeric sheets may have a smooth surface. Preferably, the polymeric sheets have a roughened surface to effectively allow most of the air to be removed from between the surfaces of the laminate during the lamination process. This can be accomplished, for example, by mechanically embossing the sheets after extrusion or by melt fracture during extrusion of the sheets and the like.

The polymeric sheets may be further modified to provide valuable attributes to the sheets and to the laminates produced therefrom. For example, the sheets may be treated by radiation, for example E-beam treatment of the sheets. E-beam treatment of the acoustic poly(vinyl acetal) sheets with an intensity in the range of about 2 to about 20 MRd will provide an increase of about 20° C. to about 50° C. in the softening point (i.e., Vicat Softening Point) of the sheets. Preferably, the radiation intensity is from about 2.5 to about 15 MRd.

Solar Control Films

The solar control films used herein may be any polymeric films with an infrared energy reflective layer. Such an infrared energy reflective layer may be a simple semi-transparent metal layer or a series of metal/dielectric layers.

The stacks of metal/dielectric layers are commonly referred to as interference filters of the Fabry-Perot type. Each layer may be on the order of an angstrom (Å) thick or thicker. The thickness of the various layers in the filter is controlled to achieve an optimum balance between the desirable infrared reflectance while maintaining the accepted visible light transmittance. The metal layers are separated (i.e. vertically in the thickness direction) from each other by one or more dielectric layers so the reflection of visible light from the metal layers interferes destructively and thereby enhances the visible light transmission. Suitable metals for the metal layers include, e.g., silver, palladium, aluminum, chromium, nickel, copper, gold, zinc, tin, brass, stainless steel, titanium nitride, and alloys or claddings thereof. For optical purposes, silver and silver-gold alloys are preferred. Metal layer thickness generally ranges from about 60 to about 200 Å, or preferably, from about 80 to about 140 Å. In general, the dielectric material should be chosen so that its refractive index is greater than the material outside the coating it abuts. It is desired that dielectric materials with a relatively high refractive index be used here. Preferably, the dielectric material may have a refractive index greater than about 1.8, or more preferably, greater than about 2.0. Additionally, the dielectric material should be transparent over the visible range. Suitable dielectric materials for the dielectric layers include, but are not limited to, zirconium oxide, tantalum oxide, tungsten oxide, indium oxide, tin oxide, indium tin oxide, aluminum oxide, zinc sulfide, zinc oxide, magnesium fluoride, niobium oxide, silicon nitride, and titanium oxide. Preferably the dielectric materials are selected from tungsten oxides, indium oxides, tin oxides, and indium tin oxides.

Generally, the metal/dielectric layers are applied onto the polymeric films through vacuum deposition processes, such as vacuum evaporation processes or sputtering deposition processes. Examples of such processes include resistance heated, laser heated or electron-beam vaporization evaporation processes and DC or RF sputtering processes (diode and magnetron) under normal and reactive conditions.

In one preferred embodiment, the solar control film is in the form of an interference filter film, such as those disclosed in U.S. Pat. No. 4,799,745 and U.S. Pat. No. 4,973,511. In particular, U.S. Pat. No. 4,799,745 discloses a transparent, infrared reflecting composite film including a transparent plastic film layer (e.g., a poly(ethylene terephthalate) film) and adhered to one side of the film layer a filter coating, which is formed of at least two transparent metal layers separated from one another by a dielectric layer; and U.S. Pat. No. 4,973,511 discloses a solar control film comprising a transparent plastic film layer (e.g., a poly(ethylene terephthalate) film) and coated to one side of the film layer a filter coating, which is formed of (i) at least one metal layer and at least one adjacent adherent dielectric layer or (ii) at least one metal layer and bonded on each side thereof at least two dielectric layers.

In such films, the coating layers may be further adjusted to reflect particular wave lengths of energy, in particular, heat and other infrared wavelengths. For example, as it is generally known within the art, varying the thickness and composition of a dielectric layer spaced between two reflecting metal layers will vary the optical transmittance/reflection properties considerably. More specifically, varying the thickness of the spacing between the dielectric layers varies the wave length associated with the reflection suppression (or transmission enhancement) band. In addition to the choice of metal, thickness also determines its reflectivity. Generally, the thinner the layer, the less its reflectivity is. To obtain desirable optical properties, the thickness of the spacing between the dielectric layer(s) is preferably about 200 to about 1200 Å, or more preferably, about 450 to about 1000 Å.

For automotive end-uses, the metal/dielectric stacks preferably contain at least two near infrared reflecting metal layers which in operative position transmit at least 70% visible light of normal incidence measured as specified in ANSI Z26.1. For architectural applications, the metal/dielectric stacks may have lower levels of visible light transmittance. Preferably, however, the visible light reflectance from the surface of the metal/dielectric stack should be less than about 8%. The inclusion of exterior dielectric layers in contact with the metal layer surfaces opposite to the metal surfaces contacting spacing dielectric layer(s) may further enhance anti-reflection performance. The thickness of such exterior or outside dielectric layer(s) is generally about 20 to about 600 Å, or preferably, about 50 to about 500 Å.

The above description should not be considered limiting. Essentially any polymeric film with a coating of infrared reflecting material may find utility in the acoustic solar control laminates described herein.

Commercial examples of solar control films coated with metal/dielectric stacks are available from Southwall Technologies, Inc. (Palo Alto, Calif. ("Southwall")) under the trade names of XIR™ 70 and XIR™ 75.

Rigid Sheets

The two outer layers of the acoustic solar control safety laminates are formed of rigid sheets, which may be selected from glass or rigid transparent plastic sheets (such as sheets of polycarbonate, acrylics, polyacrylate, poly(methyl methacrylate), cyclic polyolefins (e.g., ethylene norbornene polymers), polystyrene (preferably metallocene-catalyzed) and the like and combinations thereof). Preferably, the rigid sheet comprises a material with a modulus of about 100,000 psi (690 MPa) or greater (as measured by ASTM Method D-638). Preferably the rigid sheet is formed of glass, polycarbonate, poly(methyl methacrylate), or combinations thereof. More preferably, the rigid sheet is a glass sheet.

The term "glass" is meant to include not only window glass, plate glass, silicate glass, sheet glass, low iron glass, and float glass, but also includes colored glass, specialty glass which includes ingredients to control, for example, solar heating, coated glass with, for example, sputtered metals, such as silver or indium tin oxide, for solar control purposes, E-glass, Toroglass, Solex® glass (PPG Industries, Pittsburgh, Pa.) and the like. Such specialty glasses are disclosed in, e.g., U.S. Pat. No. 4,615,989; U.S. Pat. No. 5,173,212; U.S. Pat. No. 5,264,286; U.S. Pat. No. 6,150,028; U.S. Pat. No. 6,340,646; U.S. Pat. No. 6,461,736; and U.S. Pat. No. 6,468,934. The glass may also include frosted or etched glass sheet. Frosted and etched glass sheets are articles of commerce and are well disclosed within the common art and literature. The type of glass to be selected for a particular laminate depends on the intended use.

Adhesives and primers may be used to enhance the bond strength between the laminate layers, if desired.

Lamination Process

The safety glass laminates disclosed herein may be produced through autoclave and non-autoclave processes, as described below.

In a conventional autoclave process, the first rigid sheet, the multi-layer interlayer, and the second rigid sheet are laminated together under heat and pressure. An interlayer for an acoustic solar control laminate may comprise a first polymeric sheet, a solar control film, and a second polymeric sheet, wherein at least one of the polymeric sheets comprises an acoustic poly(vinyl acetal) composition. Preferably, the rigid sheets have been washed and dried. A typical rigid sheet is a 90 mil thick annealed flat glass.

Before lamination, the individual layers are stacked in the desired order to form the pre-press assembly. The assembly is then placed into a bag capable of sustaining a vacuum ("a vacuum bag"), the air is drawn out of the bag by a vacuum line or other means, the bag is sealed while the vacuum is maintained (for example, in the range of about 27-28 inches Hg (689-711 mm Hg)), and the sealed bag is placed in an autoclave at a temperature of about 130° C. to about 180° C., at a pressure of about 150 to about 250 psi (about 11.3 to about 18.8 bar), for about 10 to about 50 minutes. Preferably the bag is autoclaved at a temperature of about 120° C. to about 160° C. for 20 to about 45 minutes. More preferably the bag is autoclaved at a temperature of about 135° C. to about 160° C. for about 20 to about 40 minutes. Most preferably the bag is autoclaved at a temperature of about 145° C. to about 155° C. for about 25 to about 35 minutes. A vacuum ring may be substituted for the vacuum bag. One type of suitable vacuum bags is disclosed within U.S. Pat. No. 3,311,517.

Alternatively, other processes may be used to produce the laminates. Any air trapped within the glass/multi-layer interlayer/glass assembly may be removed through a nip roll process. For example, the assembly may be heated in an oven at about 80° C. to about 120° C., preferably about 90° C. to about 100° C., for about 20 to about 40 minutes. Thereafter, the heated assembly is passed through a set of nip rolls so that the air in the void spaces between the glass and the interlayer may be squeezed out, and the edge of the assembly sealed. The assembly at this stage is referred to as a pre-press.

The pre-press assembly may then be placed in an air autoclave where the temperature is raised to about 120° C. to about 160° C., preferably about 135° C. to about 160° C., at a pressure of about 100 to about 300 psi, preferably about 200 psi (14.3 bar). These conditions are maintained for about 15 minutes to about 1 hour, preferably about 20 to about 50 minutes, after which, the air is cooled while no more air is added to the autoclave. After about 20 to about 40 minutes of cooling, the excess air pressure is vented and the laminates are removed from the autoclave. This should not be considered limiting. Essentially any lamination process may be used.

The laminates can also be produced through non-autoclave processes. Such non-autoclave processes are disclosed, for example, within U.S. Pat. No. 3,234,062; U.S. Pat. No. 3,852,136; U.S. Pat. No. 4,341,576; U.S. Pat. No. 4,385,951; U.S. Pat. No. 4,398,979; U.S. Pat. No. 5,536,347; U.S. Pat. No. 5,853,516; U.S. Pat. No. 6,342,116; U.S. Pat. No. 5,415,909; US 2004/0182493; EP 1 235 683 B1; WO 91/01880; and WO 03/057478 A1. Generally, the non-autoclave processes include heating the pre-press assembly and the application of vacuum, pressure or both. For example, the pre-press may be successively passed through heating ovens and nip rolls.

The following examples are provided to describe the invention in further detail. These examples, which set forth a preferred mode presently contemplated for carrying out the invention, are intended to illustrate and not to limit the invention.

EXAMPLES

Analytical Methods

I. Determination of Loss Factor ($\eta$):

In the following examples, the loss factor ($\eta$) (a measure of sound insulating properties) was determined from the measurement of the input impedence of a glass beam sample. A glass laminate (approximately 25 mm by 300 mm) was placed at its center onto an impact button (15 mm diameter), and affixed thereto with a cyanoacrylic glue. The impact button was supported on an impedence head, which was used to apply a measured force to the specimen via the impact button. The measured force was a white noise force oscillating at a frequency between 0 and 7000 Hz. The loss factor ($\eta$) was then calculated using the formula:

$$\eta = \Delta f_i / f_{resi}$$

where $\Delta f_i$ was the frequency difference between the frequencies on the resonance curve ($f_{resi}$) having an impedence of 3 dB less than the maximum impedence. The specimen was held in an environmental chamber at the desired set temperature before and during the time in which the measurement was conducted. The impedence head was connected to a dash pot, which was connected to a power amplifier, which was connected to a noise generator. The impedence was measured by processing the raw noise data with a fast Fourier transform (FFT) analyzer/computer set-up. Such methods are summarized, for example, in the ISO 140 test protocol.

II. Determination of Solar Control Properties:

In the following examples, the solar control properties were measured according to the procedures set forth in ASTM test method E424, ASTM test method E308, and in the ISO9050:2003 and ISO 13837 test methods using a Perkin Elmer Lambda 19 spectrophotometer.

Example 1

Glass laminates composed of a first glass layer, a first acoustic poly(vinyl butyral) sheet, an XIR™ 75 Blue film (Southwall), a second acoustic poly(vinyl butyral) sheet and a second glass layer, in which the acoustic poly(vinyl butyral) sheets comprised 100 parts per hundred (pph) of poly(vinyl butyral) with a hydroxyl number of 18.5 and 46.5 pph of the plasticizer tetraethylene glycol diheptanoate, were produced in the following manner. The acoustic poly(vinyl butyral) sheets (12 inches by 12 inches (305 mm by 305 mm)) by 40 mils thick), and the XIR™ 75 Blue film (12 inches by 12 inches (305 mm by 305 mm)) are conditioned at 23% relative humidity (RH) at a temperature of 72° F. overnight. The laminate layers are laid up and the assembly is placed into a vacuum bag and heated to 90-100° C. for 30 minutes to remove any air contained between the layers of the assembly. The assembly is then subjected to autoclaving at 135° C. for 30 minutes in an air autoclave at a pressure of 200 psig (14.3 bar), as described above. The air is then cooled without adding any further air to the autoclave. After 20 minutes of cooling, when the air temperature is less than about 50° C., the excess pressure is vented, and the final laminate is removed from the autoclave.

As described above, 25 mm by 277 mm samples were cut out of the laminate and tested for the loss factor at various temperatures and frequencies. At 10° C., the loss factor was 0.071 at a frequency of 250 Hz, 0.1222 at a frequency of 1222 Hz, 0.1373 at a frequency of 2844 Hz, 0.1422 at a frequency of 4712 Hz, and 0.1357 at a frequency of 6961.1 Hz. At 20° C., the loss factor was 0.2292 at a frequency of 215 Hz, 0.2655 at a frequency of 965 Hz, 0.2672 at a frequency of 2252 Hz, 0.2454 at a frequency of 3848 Hz, and 0.2079 at a frequency of 5817.1 Hz. At 30° C., the loss factor was 0.4865 at a frequency of 180 Hz, 0.3450 at a frequency of 887, Hz 0.2775 at a frequency of 2200 Hz, 0.2026 at a frequency of 4124 Hz, and 0.1792 at a frequency of 6644.3 Hz.

As described above, 25 mm by 257 mm samples were cut out of the laminate and tested for the loss factor at various temperatures and frequencies. At 10° C., the loss factor was 0.0728 at a frequency of 333 Hz, 0.1261 at a frequency of 1573 Hz, 0.1539 at a frequency of 3608 Hz, and 0.1602 at a frequency of 5968 Hz. At 20° C., the loss factor was 0.2223 at a frequency of 283 Hz, 0.2542 at a frequency of 1264 Hz, 0.2517 at a frequency of 2928 Hz, and 0.1960 at a frequency of 5034.1 Hz. At 30° C., the loss factor was 0.4874 at a frequency of 143 Hz, 0.3631 at a frequency of 675 Hz, 0.3049 at a frequency of 1668 Hz, 0.2272 at a frequency of 3080 Hz, and 0.1790 at a frequency of 4982.7 Hz.

Example 2

By the same process as used in Example 1, glass laminates composed of a first glass layer, a first acoustic poly(vinyl butyral) sheet, an XIR™ 70 film (Southwall), a second acoustic poly(vinyl butyral) sheet and a second glass layer in which the acoustic poly(vinyl butyral) sheets comprised 100 pph of poly(vinyl butyral) with a hydroxyl number of 18.5 and 48.5 pph of the plasticizer tetraethylene glycol diheptanoate, are prepared.

Example 3

By the same process used in Example 1, glass laminates composed of a first glass layer, a first acoustic poly(vinyl butyral) sheet, an XIR™ 75 Blue film (Southwall), a second acoustic polyvinyl butyral sheet and a second glass layer, in which the acoustic poly(vinyl butyral) sheets comprised 100 pph of poly(vinyl butyral) with a hydroxyl number of 18.5 and 48.5 pph of the plasticizer tetraethylene glycol diheptanoate, are prepared.

Example 4

By the same process used in Example 1, glass laminates composed of a first glass layer, a first acoustic poly(vinyl butyral) sheet, an XIR™ 75 Green film (Southwall), a second acoustic poly(vinyl butyral) sheet, and a second glass layer, in which the acoustic poly(vinyl butyral) sheets comprised 100 pph of poly(vinyl butyral) with a hydroxyl number of 18.5 and 48.5 pph of plasticizer tetraethylene glycol diheptanoate, are prepared.

Example 5

By the same process used in Example 1, glass laminates composed of a first glass layer, a Butacite® poly(vinyl butyral) sheet (DuPont), a XIR™ 70 HP Auto film (Southwall), an acoustic poly(vinyl butyral) sheet and a second glass layer, in which the acoustic poly(vinyl butyral) sheets comprised 100 parts pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.354 and a visible transmission of 0.719.

Example 6

By the same process used in Example 1, glass laminates composed of a first glass layer, an Evasafe™ poly(ethylene-co-vinyl acetate) sheet (Bridgestone), a XIR™ 70 HP Auto film (Southwall), an acoustic poly(vinyl butyral) sheet and a second glass layer, in which the acoustic poly(vinyl butyral) sheet comprised 100 parts pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.340 and a visible transmission of 0.675.

Example 7

By the same process used in Example 1, glass laminates composed of a first glass layer, a SentryGlas® Plus sheet (DuPont), a XIR™ 70 HP Auto film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.357 and a visible transmission of 0.696.

Example 8

By the same process used in Example 1, glass laminates composed of a first glass layer, a Butacite® poly(vinyl butyral) sheet (DuPont), a XIR™ 70 Auto Blue V.1 film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminate was tested for solar control properties as described above and found to have a solar transmission of 0.478 and a visible transmission of 0.752.

Example 9

By the same process used in Example 1, glass laminates composed of a first glass layer, an Evasafe™ poly(ethylene-co-vinyl acetate) sheet (Bridgestone), a XIR™ 70 Auto Blue V.1 film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.456 and a visible transmission of 0.712.

Example 10

By the same process used in Example 1, glass laminates composed of a first glass layer, a SentryGlas® Plus sheet (DuPont), a XIR™ 70 Auto Blue V.1 film (Southwall), an acoustic poly(vinyl butyral) sheet, and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.461 and a visible transmission of 0.716.

Example 11

Glass laminates composed of a first glass layer, a Butacite® poly(vinyl butyral) sheet (DuPont), a XIR™ 75 Green film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.465 and a visible transmission of 0.730.

Example 12

By the same process used in Example 1, glass laminates composed of a first glass layer, an Evasafe™ poly(ethylene-co-vinyl acetate) sheet (Bridgestone), a XIR™ 75 Green film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.448 and a visible transmission of 0.694.

Example 13

By the same process used in Example 1, glass laminates composed of a first glass layer, a SentryGlas® Plus sheet (DuPont), a XIR™ 75 Green film, (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.435 and a visible transmission of 0.688.

Example 14

By the same process used in Example 1, glass laminates composed of a first glass layer, a Butacite® poly(vinyl butyral) sheet (DuPont), a XIR™ Laminated 72-47 film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.419 and a visible transmission of 0.710.

Example 15

By the same process used in Example 1, glass laminates composed of a first glass layer, an Evasafe™ poly(ethylene-co-vinyl acetate) sheet (Bridgestone), a XIR™ Laminated 72-47 film (Southwall), an acoustic poly(vinyl butyral) sheet and a second glass layer, in which the acoustic poly(vinyl butyral) sheets comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.400 and a visible transmission of 0.674.

Example 16

By the same process used in Example 1, glass laminates composed of a first glass layer, a SentryGlas® Plus sheet (DuPont), a XIR™ Laminated 72-47 film (Southwall), an acoustic poly(vinyl butyral) layer and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.420 and a visible transmission of 0.709.

Example 17

By the same process used in Example 1, glass laminates composed of a first glass layer, a Butacite® poly(vinyl butyral) sheet (DuPont), a XIR™ 70 HP film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminate was tested for solar control properties as described above and found to have a solar transmission of 0.359 and a visible transmission of 0.719.

Example 18

By the same process used in Example 1, glass laminates composed of a first glass layer, an Evasafe™ poly(ethylene-co-vinyl acetate) sheet (Bridgestone), a XIR™ 70 HP film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.334 and a visible transmission of 0.672.

Example 19

By the same process used in Example 1, glass laminates composed of a first glass layer, a SentryGlas® Plus sheet (DuPont), a XIR™ 70 HP film (Southwall), an acoustic poly(vinyl butyral) sheet and a second glass layer, in which the acoustic poly(vinyl butyral) sheet comprised 100 pph of poly(vinyl butyral) with a hydroxyl number of 18.5 and 48.5 pph of the plasticizer tetraethylene glycol diheptanoate, were prepared.

The laminates were tested for solar control properties as described above and found to have a solar transmission of 0.355 and a visible transmission of 0.708.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. An acoustic solar control laminate consisting of:
   (a) a first rigid sheet;
   (b) a first polymeric sheet;
   (c) a polymeric film, which is coated on at least one side with an infrared energy reflective layer;
   (d) a second polymeric sheet; and
   (e) a second rigid sheet;
   wherein the first rigid sheet is adhered to the first polymeric sheet; the first polymeric sheet is adhered to the polymeric film; the polymeric film is adhered to the second polymeric sheet; and the second polymeric sheet is adhered to the second rigid sheet;

and further wherein the first polymeric sheet comprises an acoustic poly(vinyl acetal) composition having a glass transition temperature of 23° C. or less, said acoustic poly(vinyl acetal) composition comprising a plasticizer and a poly(vinyl acetal), said poly(vinyl acetal) being produced by acetalizing a poly(vinyl alcohol) with one or more aldehydes containing 4 to 6 carbon atoms, said poly(vinyl acetal) having an acetalization degree of at least about 50 mole %, and said poly(vinyl acetal) having a saponification degree of at least 95 mole %, based on the total number of moles of vinyl groups in the poly(vinyl acetal); and wherein the first and the second rigid sheets are each formed of a material having a modulus of at least about 100,000 psi (690 MPa).

2. The acoustic solar control laminate of claim 1, wherein the aldehyde is n-butyl aldehyde and the poly(vinyl acetal) is a polyvinyl butyral).

3. The acoustic solar control laminate of claim 1, wherein the acoustic poly(vinyl acetal) composition comprises a poly(vinyl acetal) and about 40 to about 60 parts per hundred (pph) of a plasticizer, based on 100 parts by weight of the poly(vinyl acetal).

4. The acoustic solar control laminate of claim 3, wherein the poly(vinyl acetal) is a poly(vinyl butyral).

5. The acoustic solar control laminate of claim 1, wherein the acoustic poly(vinyl acetal) sheet has a thickness of at least about 0.25 mm.

6. The acoustic solar control laminate of claim 5, wherein the acoustic poly(vinyl acetal) sheet has a thickness of about 0.38 to about 1.74 mm.

7. The acoustic solar control laminate of claim 1, wherein the second polymeric sheet comprises a second acoustic poly(vinyl acetal) composition having a glass transition temperature of 23° C. or less, and wherein the acoustic poly(vinyl acetal) compositions in the first and second polymeric sheets may be the same or different.

8. The acoustic solar control laminate of claim 1, wherein the polymeric film comprises a polyester.

9. The acoustic solar control laminate of claim 8, wherein the polymeric film comprises a poly(ethylene terephthalate).

10. The acoustic solar control laminate of claim 1, wherein the infrared energy reflective layer comprises a metal layer or a Fabry-Perot type interference filter layer.

11. The acoustic solar control laminate of claim 1, wherein each of the first and second rigid sheets comprises a material selected from glasses and polymers having a modulus of about 100,000 psi (690 MPa) or greater, and wherein the materials of the first and second rigid sheets may be the same or different.

12. The acoustic solar control laminate of claim 11, wherein the first and second rigid sheets are glass sheets.

13. The acoustic solar control laminate of claim 1, wherein the second polymeric sheet comprises a second acoustic poly(vinyl acetal) composition having a glass transition temperature of 23° C. or less; and wherein the first and second acoustic poly(vinyl acetal) compositions may be the same or different.

* * * * *

UNITED STATES PATENT AND TRADEMARK OFFICE
CERTIFICATE OF CORRECTION

PATENT NO. : 7,968,186 B2  
APPLICATION NO. : 11/825041  
DATED : June 28, 2011  
INVENTOR(S) : Donald L Rymer and Richard Allen Hayes Page 1 of 1

It is certified that error appears in the above-identified patent and that said Letters Patent is hereby corrected as shown below:

In the Claims:

Column 23, line 21, delete "polyvinyl butyral)" and insert --poly(vinyl butyral)--

Signed and Sealed this  
Twenty-fifth Day of June, 2013

Teresa Stanek Rea  
*Acting Director of the United States Patent and Trademark Office*